US008142603B2

(12) United States Patent
Sagona et al.

(10) Patent No.: US 8,142,603 B2
(45) Date of Patent: Mar. 27, 2012

(54) ACTIVE FILM ADHERED TO FLEXIBLE PACKAGES AND METHOD THEREOF

(75) Inventors: Peter J. Sagona, Pottstown, PA (US); Jonathan R. Freedman, Auburn, AL (US); Jean Pierre Giraud, Paris (FR)

(73) Assignee: CSP Technologies, Inc., Amsterdam, NY (US)

(*) Notice: Subject to any disclaimer, the term of this patent is extended or adjusted under 35 U.S.C. 154(b) by 209 days.

(21) Appl. No.: 10/599,247

(22) PCT Filed: Mar. 28, 2005

(86) PCT No.: PCT/US2005/010347
§ 371 (c)(1),
(2), (4) Date: Jul. 31, 2008

(87) PCT Pub. No.: WO2005/095216
PCT Pub. Date: Oct. 13, 2005

(65) Prior Publication Data

US 2008/0283184 A1 Nov. 20, 2008

(51) Int. Cl.
*B32B 37/00* (2006.01)
*B29C 65/00* (2006.01)

(52) U.S. Cl. ...................... 156/308.4; 156/250; 156/256; 156/308.2; 156/580; 156/583.1

(58) Field of Classification Search ..... 156/308.2–309.9
See application file for complete search history.

(56) References Cited

U.S. PATENT DOCUMENTS

| | | | | |
|---|---|---|---|---|
| 4,372,098 | A * | 2/1983 | Mason | 53/412 |
| 5,698,217 | A * | 12/1997 | Wilking | 424/448 |
| 5,740,661 | A | 4/1998 | Yamaguchi | |
| 6,010,715 | A | 1/2000 | Wick | |
| 6,174,952 | B1 * | 1/2001 | Hekal et al. | 524/503 |
| 6,177,183 | B1 * | 1/2001 | Hekal | 428/321.5 |
| 6,316,520 | B1 * | 11/2001 | Hekal | 523/102 |
| 6,531,197 | B2 * | 3/2003 | Neteler | 428/34.7 |

FOREIGN PATENT DOCUMENTS

| | | | |
|---|---|---|---|
| DE | 102004013664 A1 | | 9/2005 |
| EP | 0646457 | | 9/1994 |
| JP | 03096334 | | 4/1991 |
| JP | 05193064 | | 8/1993 |
| JP | 09-226843 | | 9/1997 |
| JP | 09226843 A | * | 9/1997 |
| JP | 2000127294 | | 5/2000 |
| JP | 2004330451 | | 11/2004 |
| WO | PCT/US2005/010347 | | 10/2005 |

OTHER PUBLICATIONS

European Search Report EP 05730611.0.
Notice of Reasons for Rejection (Translation) JP 2007-505266.

* cited by examiner

*Primary Examiner* — Khanh Nguyen
*Assistant Examiner* — Carson Gross
(74) *Attorney, Agent, or Firm* — Greenberg Traurig, LLP

(57) ABSTRACT

The present invention relates to a method of attaching an active film (5) onto a flexible package comprising the steps of heating a foil (2); applying an active film (5) to the foil (2); and applying sufficient pressure to the active film (5) and foil (2) combination and sufficient heat to the foil (2) so that active film (5) adheres to the foil (2). In one example, the active film (5) comprises two components and wherein the two components are an active agent and a polymer. In another example, the active agent is an absorbing material.

12 Claims, 2 Drawing Sheets

ACTIVE FILM ADHERED TO FLEXIBLE PACKAGES AND METHOD THEREOF

FIELD OF THE INVENTION

The present invention relates to a method of attaching an active film onto a flexible package by heat staking the active film to the seal layer of the flexible package. The present invention also relates to a flexible package that comprises an active film that is produced by heat staking the active film to the seal layer of the flexible package.

BACKGROUND OF THE INVENTION

Many products (e.g. diagnostic test strips, medicinal pills and tablets) are sensitive to environmental effects such as moisture and/or oxygen. One conventional method of attempting to protect these products from such environmental effects is to package these products in foil pouches. Additionally, a desiccant material may be inserted into the pouch as a loose material for additional control of the packaged environment.

SUMMARY OF THE INVENTION

In one embodiment of the present invention the method of attaching an active film onto a flexible package comprises the steps of heating a foil; applying an active film to the foil; and applying sufficient pressure to the active film and foil combination and sufficient heat to the foil so that active film adheres to the foil seal layer In another embodiment of the present invention, the method of attaching an active film onto a flexible package comprises the steps of advancing a foil from a foil supply roll; advancing an active film from an active film supply roll; cutting the active film into a pre-determined length; heating the foil; applying the cut active film to the foil; and applying sufficient pressure to the active film and foil combination and sufficient heat to the foil so that active film adheres to the foil seal layer.

BRIEF DESCRIPTION OF THE DRAWINGS

The following figures are merely illustrative of the present invention and are not meant to limit the invention to the embodiments shown in the figures.

Figure 1:
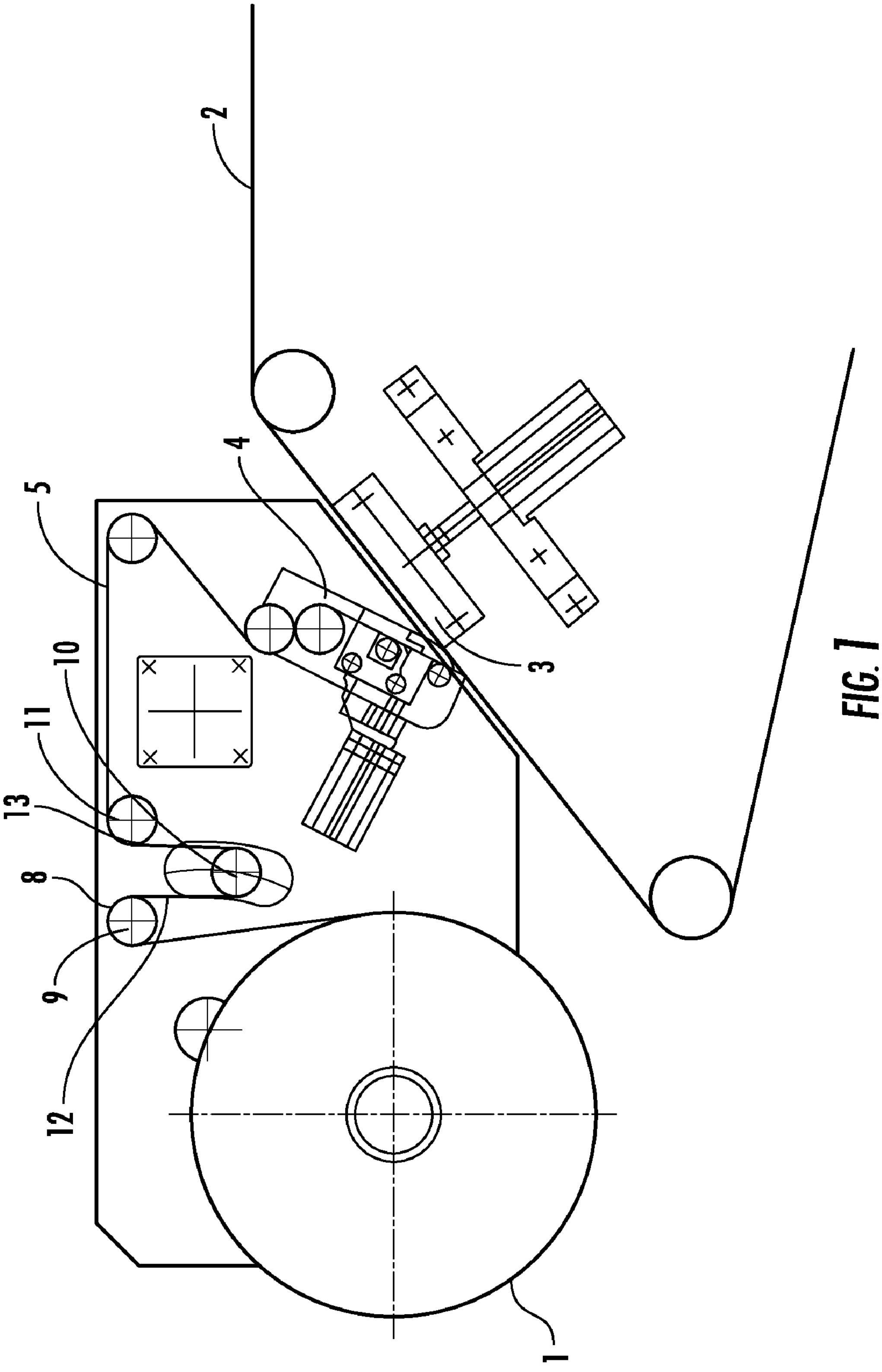
FIG. 1 illustrates one embodiment of the present invention showing a schematic of a side view of the continuous master roll with the active film being applied to the foil lidding stock with a heated platen.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE PRESENT INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment, the present invention relates to a method of attaching an active film onto a flexible package by heat staking the active film to the seal layer of the flexible package. In one example, the amount of active film that is used in the package is based on the particular shelf life requirements of the product package. The active film is composed of an active agent. In a specific embodiment, the loading of active agent in the active film can range from about 30 to about 80%, more particularly from about 40 to about 60% based on the total weight of the film.

For purposes of the present invention, the active film may be composed of one or more of the following "active agents": an absorbing material, a releasing material, and/or an activation material. A list of active agents includes, but is not limited to: desiccants, oxygen absorbers, odor absorbers, ethylene absorbers, $CO_2$ absorbers, fragrance/aroma release, and/or nutrient release.

Examples of absorption material include, but are not limited to, one or more one or more desiccating compounds. For example, there are three primary types of desiccating compounds that may be used with the present invention. The first type comprises chemical compounds that can combine with water to form hydrates. Examples of such desiccant are anhydrous salts which tend to absorb water or moisture and form a stable hydrate. In this reaction with the moisture, a stable compound is formed within which the moisture is held and prevented from release by chemical interaction. The second type of desiccant compounds are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as a desiccant. These reactive type desiccants are mainly used in solvent drying and as water-absorbing materials to polymers which must themselves be maintained in a moisture reduced state. The third type of desiccants obtain their moisture absorbing capabilities through physical absorption. The absorption process is accomplished because of a fine capillary morphology of the desiccant particles which pulls moisture therethrough. The pore size of the capillaries, as well as the capillaries' density determine the absorption properties of the desiccant. Examples of these physical absorption desiccants include molecular sieves, silica gels, clays (e.g. montmorillimite clay), certain synthetic polymers (e.g. those used in baby diapers), and starches. Because these types of physical absorption desiccants are both inert and non-water soluble, they are preferred for many applications.

In another embodiment, the absorbing materials may be either: (1) metals and alloys such as, but not limited to, nickel, copper, aluminum, silicon, solder, silver, gold; (2) metal-plated particulate such as silver-plated copper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$, WC, fused silica, filmed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; and (5) elastomers, such as polybutadiene, polysiloxane, and semi-metals, ceramic. In another example, the absorbing material may be calcium oxide. In the presence of moisture and carbon dioxide, the calcium oxide is converted to calcium carbonate. Accordingly, calcium oxide may be used as the absorbing material in application where absorption of carbon dioxide is needed. Such applications include preserving fresh foods (e.g. fruits and vegetables) that give off carbon dioxide.

In yet another embodiment, the activation material may include a material that requires a specific liquid, vapor, or gas to activate the material and, after activation, the material releases the desired vapor, liquid, or gas. In one embodiment, moisture is used to activate the material. In another embodiment, oxygen is used to activate the material. In a further embodiment, an acid is used to activate the material. In yet a further embodiment a base is used to activate the material. In yet another embodiment, a variety of materials may be released. Such material may comprise any suitable form which will release dispersant to surrounding atmosphere, including solid, gel, liquid, and, in some cases, a gas. These substances can perform a variety of functions, including: serving as a fragrance or perfume source; supplying a biologically active ingredient such as a biocide, antimicrobial agent, pesticide, pest repellent, bait, aromatic medicine, etc.; providing humidifying or desiccating substances; or delivering air-borne active chemicals, such as corrosion inhibitors, ripening agents and odor-masking agents.

In yet another embodiment of activation material, some catalyzed reactions may generate hydrogen peroxide as a byproduct. The released hydrogen peroxide may be of some benefit to extend shelf life of meats, poultry and fish if the hydrogen peroxide is in direct contact with the wet surfaces of those foods. Alternatively, concern about the generation of hydrogen peroxide may be minimized by including catalase in the enzyme system.

In one embodiment, the active film thickness may be in the range of about 0.05 mm to about 1.0 mm, more particularly about 0.2 to about 0.6 mm. In one example, the active film may be made of a single or multi-layer construction. In another example, one of the film layers can be a FDA or EU approved layer for direct contact with the pharmaceutical or food product—the second layer can contain the active layer.

In a further embodiment, the active film may be produced as two components—the film and the active agent. In another embodiment, the active film may be produced as at least three components. One example of the three component composition is the compositions and methods disclosed in one or more of the following U.S. Pat. Nos. 5,911,937, 6,214,255, 6,130,263, 6,080,350 and 6,174,952, 6,124,006, and 6,221,446. In another embodiment the film may be composed of a thermoplastic (e.g. polypropylene, polyethylene and mixtures thereof.

In one example, the active film is manufactured in an extrusion process and collected into continuous master rolls. For example, the master film roll may be cut into narrower rolls. In one embodiment, continuous rolls of active film are supplied to the end user—food, pharmaceutical or medical device customers for final packaging.

In yet another embodiment, the present invention may be used in conjunction with products that are sensitive to environmental effects such as moisture (e.g. diagnostic test strips). In one example, the present invention adheres the active film to the foil material out of the way of the sealing area so that the seal is not compromised. When the package is opened, the active film remains secured to the foil and the user interacts with only the product.

In another embodiment, the cut pieces of active film are adhered to the foil material by heating the foil and using the heat seal layer of the existing foil to bond the active film to the foil. Since the active film is attached, by proper selection of the area for bonding, the active film is maintained within the package and inside the sealing areas so that it does not compromise the seal.

In yet another embodiment, the active film is adhered by using a method such as heat staking, where the heat sealing properties of the foil are used without the need for the addition of other materials, such as adhesives, which may interact with the product. For purposes of the present invention, the term "heat staking" means utilizing the heat sealing materials of the foil to sufficiently heat the foil so as to secure the active film to foil.

In one embodiment, the foil material is composed of a generic pouch stock. In one example, the foil material is a composite comprising a layer of polyester film, adhesive. Al-Foil material and polyester film (e.g. LLDPE).

FIG. 1 illustrates one embodiment of the present invention showing a schematic of a side view of the continuous master roll with the active film being applied to the foil lidding stock with a heated platen. The active film is advanced from the supply roll 1 to applicator head 4. The lidding foil 2 is advanced from a supply roll through the heating platen 3. The heating platen 3 and applicator head 4 comprise the applicator sub-system. At the applicator head 4, the active film 5 is cut to a predefined length. At the heating platen 3, the lidding foil is sufficiently heated so that the polymer sealing layer becomes pliable. The cut active film 5 is pushed onto the pliable polymer layer of the lidding foil 2 by applying sufficient pressure between the applicator head 4 and the heating platen 3. The active film 5 adheres to the softened polymer layer of the lidding foil.

Figure 2:
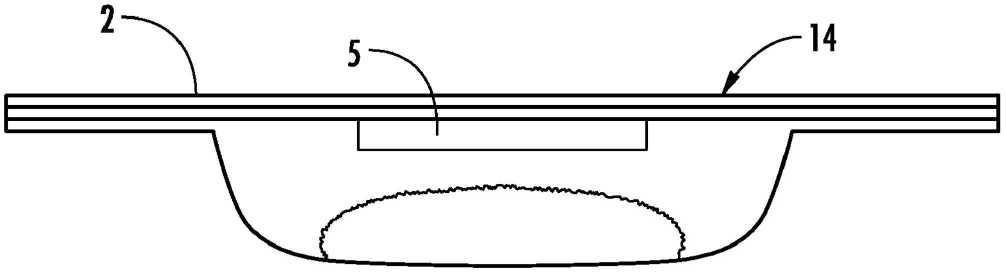
FIG. 2 is a cross sectional view of one embodiment of the present invention that illustrates an assembled blister package with the active film heat staked to the lidding foil.

FIG. 2 is a cross sectional view of an assembled blister package 14 with the active film heat staked to the lidding foil. The active film 5 is adhered to the lidding foil 2.

Figure 3:
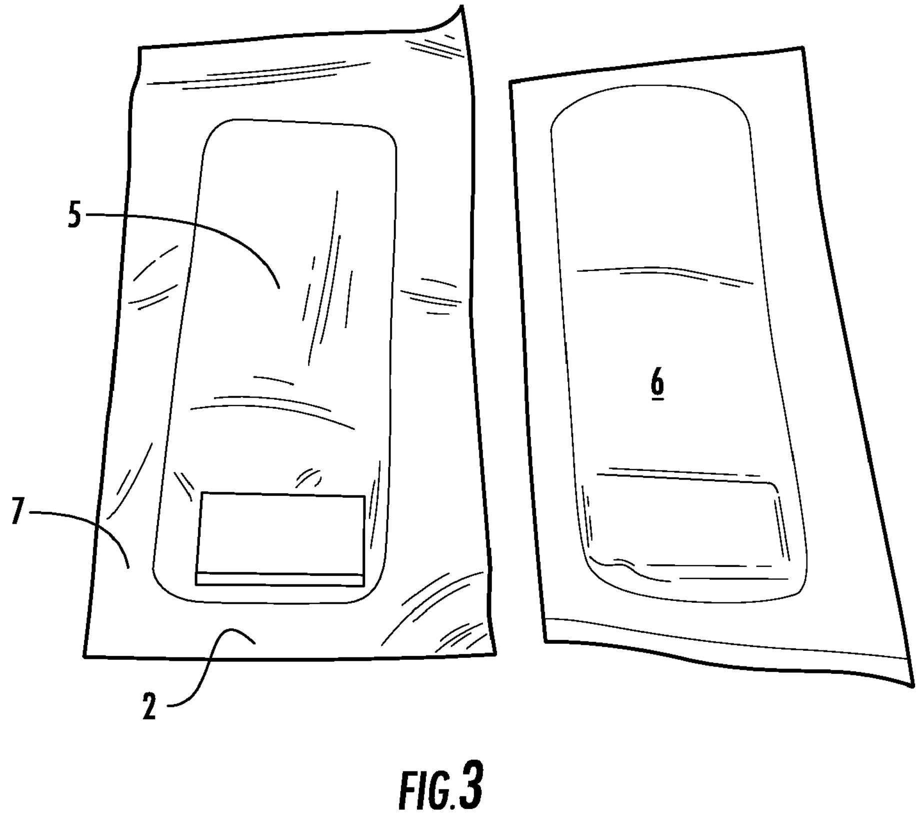
FIG. 3 is a photograph that illustrates another embodiment of the present invention showing a finished package.

FIG. 3 illustrates a foil pouch package 6 with the active film 5 positioned on the foil 2 outside of the sealing region 7. The second illustration in FIG. 3 is a finished package 6.

The following illustrates one example of the present invention. It is understood that this is merely one example and is not meant to limit the invention to this illustration. In this example, the active film is applied to the flexible pouch using conventional high speed pouching equipment. One example of conventional flexible pouching equipment is a HM-2 Series pouching machine, manufactured by Siebler Romaco, Remchingen, Germany. This machine fills and seals pouches in 4-lanes. One or more continuous rolls of active film are loaded on to the pouching machine. The active film is applied to a foil pouch using the following sequence:

1. The top and bottom flexible film components are supplied on continuous rolls.
2. One roll of active film is supplied for each of the 4-lanes.
3. A unit length of active film is advanced.
4. The active film is cut to a predetermined length (in each lane).
5. The seal layer of the flexible film is sufficiently heated such that the seal layer is soft (but not melted).
6. The cut active film is pressed into the softened seal layer material. A constant force is applied to the cut film piece.
7. The cut pieces of film are adhered to the flexible package by and using the heat seal layer of the existing foil to bond the active film.

For this example, the seal layer is composed of Polyethylene (LLDPE) or Serlyn. The foil pouch stock is manufactured by Alcan, (PHARMA CENTER SHELBYVILLE, INC), Shelbyville, Ky., USA—product number 92037. The seal layer has a melting point of about 150-170 C.

The active film used is a 0.4 mm thick cut into pieces 12.5 mm times 15.0 mm. The active film used incorporates molecular sieve desiccant in the plastic. The active film is manufactured by CSP Technologies, Auburn, Ala. The film used is M-0002—a polyethylene-based film that incorporated molecular sieve desiccant. The active film is made using a twin screw extruder. The blended compound is extruded into film or sheeting. The extruded film 5 is fed into a three roll calendaring stack 8. The three rolls 9, 10, 11 are used to both form the active film to its final thickness and to cool the molten material in a solid form. The material is passed through a nip 12 between two rolls 9, 10; it travels over the surface of the center roll 10, passes through a second nip 13, travels under the bottom roll 11 and is then transported towards the winder. The nip 13 pressures and the temperatures of each of the rolls are controlled independently. The conditions are established based on the materials used and the desired finished physical properties of the film. The nips can be set either to touch or with a fixed gap depending on the desired outcome. The active film is passed through an NDC thickness gauge. This gauge has a traversing head, which emits and measures gamma rays, which are passed through the film. Cross machine direction and machine direction data are gathered and displayed on a touch screen. The active film is then slit to the desired width and wound onto a core using a single shaft center drive winder.

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

What is claimed is:

1. A method of attaching an active film and foil combination onto a flexible package comprising the steps of:
- providing a foil having a polymer sealing layer;
- providing an active film comprising an active agent and a polymer;
- providing a flexible package;
- heating the foil such that the polymer sealing layer becomes pliable;
- selecting a sealing area of the foil for forming a seal between the foil and the flexible package and a non-sealing area of the foil not to be sealed to the flexible package;
- applying the active film to the polymer sealing layer of the heated foil in the non-sealing area of the heated foil to produce an active film and foil combination;
- applying sufficient pressure to the active film and foil combination and sufficient heat to the foil so that the active film adheres to the polymer sealing layer of the foil; and
- adhering the active film and foil combination to the flexible package by forming a seal between the sealing area of the foil and the flexible package.

2. The method of claim 1 wherein the active agent is an absorbing material.

3. The method of claim 1 wherein the active agent is a releasing material.

4. The method of claim 1 wherein the active agent is an activation material.

5. The method of claim 1 wherein a thickness of active film is in the range of about 0.05 mm to about 1.0 mm.

6. The method of claim 1 wherein the active film adheres to the foil solely by the heat and the pressure applied to the combination and without any additional adhesive materials.

7. A method of attaching an active film and foil combination onto a flexible package comprising the steps of:
- providing a foil having a polymer sealing layer;
- providing an active film comprising an active agent and a polymer;
- providing a flexible package;
- advancing the foil from a foil supply roll;
- advancing the active film from an active film supply roll;
- selecting a sealing area of the foil for forming a seal between the foil and the flexible package and a non-sealing area of the foil not to be sealed to the flexible package;
- selecting an active film attachment area of the foil for attachment of the active film;
- cutting the active film into a pre-determined length, wherein the predetermined length is sized so as to permit attachment to the foil in only the active film attachment region of the foil;
- heating the foil such that the polymer sealing layer becomes pliable;
- applying the cut active film to the polymer sealing layer of the heated foil in the active film attachment area of the foil;
- applying sufficient pressure to the active film and foil combination and sufficient heat to the foil so that the active film adheres to the polymer sealing layer of the foil to produce an active film and foil combination; and
- adhering the active film and foil combination to the flexible package by forming a seal between the sealing area of the polymer sealing layer of the foil and the flexible package.

8. The method of claim 7 wherein the active agent is an absorbing material.

9. The method of claim 7 wherein the active agent is a releasing material.

10. The method of claim 7 wherein the active agent is an activation material.

11. The method of claim 7 wherein a thickness of active film is in the range of about 0.05 mm to about 1.0 mm.

12. The method of claim 7 wherein the active film adheres to the foil solely by the heat and the pressure applied to the combination and without any additional adhesive materials.

* * * * *